United States Patent Office 3,531,392
Patented Sept. 29, 1970

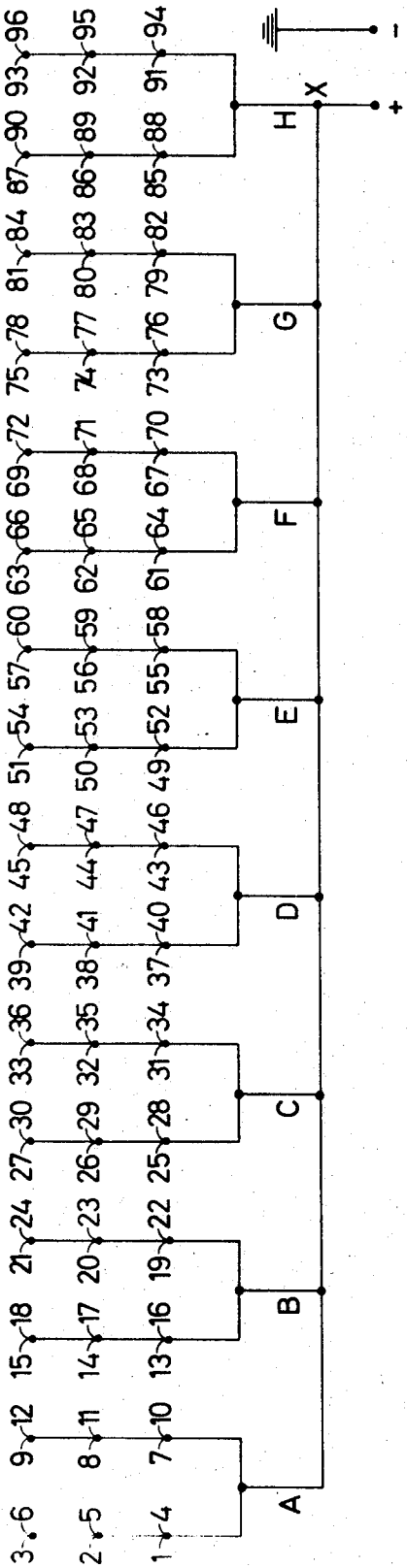
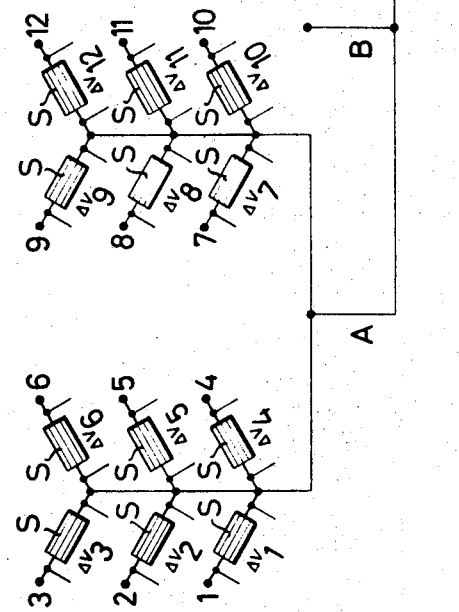
FIG.1
FIG.2

3,531,392
ARRANGEMENT FOR MEASURING THE CURRENT INTENSITY AT THE SINGLE ELECTRODES OF ELECTROLYTIC CELLS
Kurt Schmeiser, Cologne-Lindenthal, Germany, assignor to Knapsack Aktiengesellschaft, Knapsack, near Cologne, Germany, a corporation of Germany
Filed Sept. 8, 1966, Ser. No. 578,072
Claims priority, application Germany, Nov. 11, 1965, K 57,638
Int. Cl. B01k 3/00, 1/00
U.S. Cl. 204—225
8 Claims

ABSTRACT OF THE DISCLOSURE

Adjustment of the spacing between a plurality of electrodes in electrolytic cells is governed by cyclically measuring the currents in individual electrodes (by measuring the voltage drop across resistances in series with each of them) determining which cell currents are outside of a predetermined tolerance band and adjusting the spacing of the electrodes of such cells. The tolerance of the band is decreased as the spacing approaches optimum values. Apparatus for accomplishing this method includes a selective switching mechanism which cyclically connects resistances in series with each of the electrodes to a digital read-out device having a limiting-value indicator with a tolerance band of variable width. A voltage-frequency converter efficiently accomplishes current measurement across equal lengths of the tapes which conduct current to the electrodes and facilitates digital indication thereof.

Figure 3:
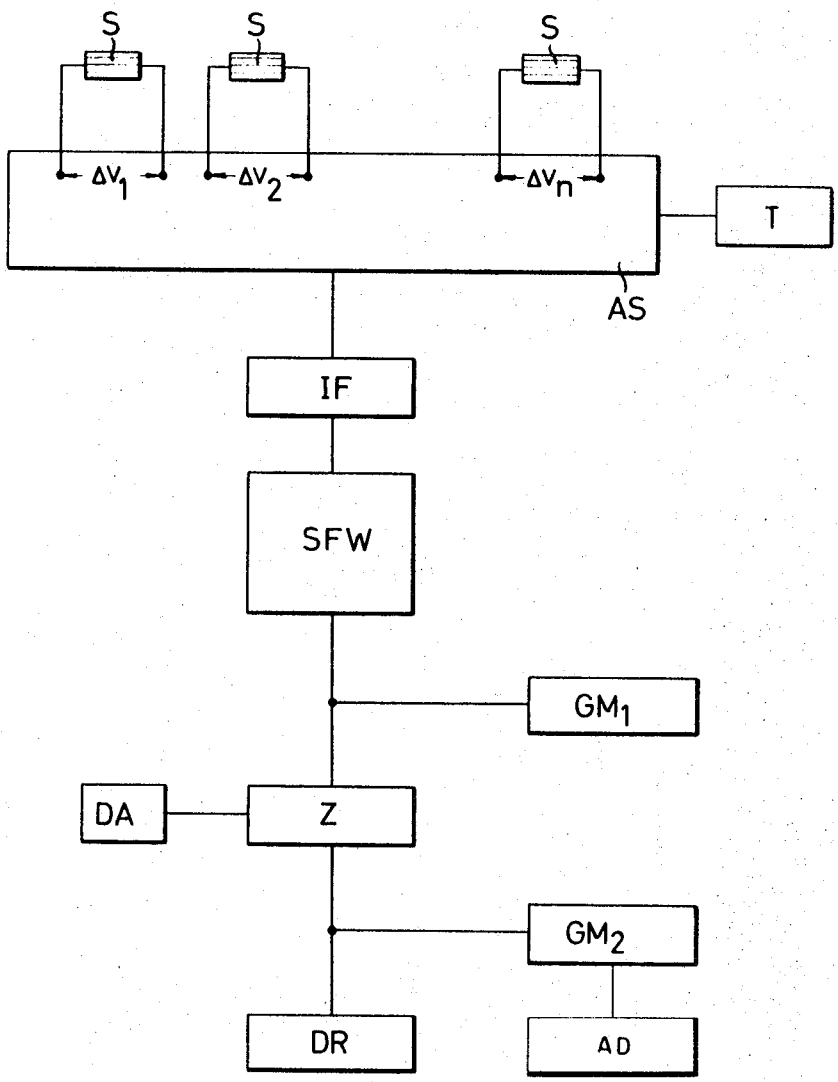

The present invention relates to an apparatus for measuring the current at individual electrodes of electrolytic cells.

In electrolytic cells, e.g. those used for making chlorine, the problem arises of regulating or adjusting the individual electrodes, which are formed of solid material and are subject to a certain degree of wear, so that for a given electrode yield the consumption of electrical power is as low as possible.

Known electrolytic cells of this kind contain a plurality of separately adjustable electrodes, for example 96 electrodes in parallel, and at the same time a number of the electrolytic cells are usually connected to each other in series. The cell voltage is no more than a few volts, but the current passing through each individual electrode may be up to 1000 amperes. When electrolysis is begun in such an electrolytic cell system, the currents flowing through the electrodes are found to vary considerably. This means that the electrodes must be adjusted so that the same current passes through each electrode, at a fairly low cell voltage. The electrode adjustment made is a reduction in the electrode spacing, i.e. the reduction of the distance between a block-shaped electrode and a counter-electrode which may be formed e.g. of graphite. The particular difficulty involved in this is that the adjustment of an electrode at which the current has been found to be too low generally results in the current in the adjacent electrode decreasing unpredictably.

It is an object of the present invention to avoid the difficulties mentioned above which are encountered in the adjustment of electrodes in electrolytic cells, by means of a suitable measuring apparatus.

According to the present invention, an apparatus for measuring the current at individual electrodes in electrolytic cells for the adjustment of those electrodes comprises a plurality of indicator means of variable tolerance (i.e. variable as between coarse and fine adjustment) for the indication, within a range defined by an upper and a lower limiting value, of limiting current values for the electrodes to be adjusted, and for the indication, upon the adjustment of one electrode to carry a current of one value (e.g. the lower limiting value), of one or more electrodes carrying currents of such values as necessitate adjustment thereof (e.g. the upper limiting value). As soon as the individual currents are found to be uniform, all electrodes connected to the particular cell concerned are lowered at a given time by an experienced rate.

In accordance with one embodiment of the present invention, the current is determined by means of a voltage-frequency converter arrnaged for digital indication. Measurement with digital indication can also be performed by means of a system functioning by a compensating method. In accordance with a further feature of the present invention, bundles of conductors leading to the electrodes and connected to the measuring and indicator system are arranged for use as measuring resistors for current measurement. This results in especially low measuring expenditure. This expedient and the measuring methods described above prevent the strong, undefined and locally varying magnetic fields found in those systems from noticeably influencing the measured current values.

In accordance with a further feature of the present invention, each of the individual potential drops measured across the measuring resistors associated with the electrodes is communicated to a central or measuring station to be indicated there in a digital current indication. As shown in the working examples hereinafter, the adjustment of the electrodes can be considerably facilitated if a digital indicator indicating the current for the individual electrodes to be adjusted is arranged as a viewable component of the electrode-adjusting system. According to a further feature of the present invention, the critical or limiting current indicator means associated with the digital measuring system has an alarm bell or other audible alarm device connected thereto, which is often advantageous. In one embodiment of the present invention, the digital measuring means is arranged to permit automatic cyclic testing of the current flowing through the individual electrodes by signalling those current values which are outside a given tolerance range. This embodiment of the measuring apparatus according to this invention can be further improved by associating with the electrodes drive means which enable the electrodes to be adjusted, and which are arranged to be automatically regulable from the measuring station for appropriate adjustment of the individual electrodes once the current flowing through an electrode is determined to be beyond a given critical or limiting value.

The adjustment of the electrodes can be facilitated further, and short-circuits inside the electrolytic cells can be guarded against by connecting one or more electrodes of each electrolytic cell to means that enable the spacing between two electrodes to be measured. In an embodiment of the present invention, the electrodes to be adjusted incorporate a radio-active preparation for determination of the electrode spacing; in this case the radiation intensity varies as the electrode spacing varies or electrode consumption proceeds.

The invention is illustrated in the accompanying drawings, wherein:
FIG. 1 is a schematic general plan view showing the disposition of 96 electrodes in an electrolytic cell, the electrodes being numbered 1 to 96, FIG. 2 is a schematic sectional view of the electrolytic cell shown in FIG. 1, and FIG. 3 is a diagrammatic representation of a typical control system in accordance with the present invention.

As will be seen, all the electrodes of the cell of FIGS. 1-2 are connected in parallel, grouped in groups of twelve, and connected through eight collecting bars A to H to a current source. The letter X denotes fixed measuring points near the cell bottom where the cell voltage is measured. The letter S denotes conductors formed of a bundle of copper tapes which are attached to the electrodes to ensure good conduction of the current from the collecting bar to the adjustable electrode. One end of each of the current tapes S is soldered into a socket (not shown in the drawing). The soldered joints also act as short-circuit fuses. Measuring points located at certain intervals on the copper tapes designate resistances which are fixed and which depend on the spacing interval alone. The drop of potential $\Delta V_1$, $\Delta V_2$ ... found to occur across these resistances is a measure of the current passing through the electrode concerned, the current being determined in accordance with the present invention by means of a voltage-frequency converter or by a compensating method. In practice it is often unnecessary specifically to equalise these resistances, but the spacing interval between the measuring points must be strictly maintained.

In FIG. 3, the letter S again denotes the copper tapes affording a connection to the adjustable electrodes in the electrolytic cells (cf. FIG. 2). The tapes S, across which the potential drops $\Delta V_1$, $\Delta V_2$ ... occur, are connected to a selective switching mechanism AS. The switches in mechanism AS are controlled e.g. by means of a selector and their function is to serve as change-over switches for the measuring points on the copper tapes; the switches successively connect the copper tapes S, if desired via an interference filter IF, to the voltage-frequency converter SFW. The selective switching mechanism AS is controlled by means of a timed-impulse generator T.

In addition to the automatic change-over switches associated with the measuring points, a hand-operated selector is preferably provided for the determination, independently of a given measuring cycle, of current intensities at individual electrodes. The voltage-frequency converter SFW has a disconnection amplifier associated therewith. This is intended for the electrical separation of the measuring circuit from other circuits of the switching arrangement so as to avoid disturbing influences. The oscillation communicated from the voltage-frequency converter SFW, and having a frequency proportional to the applied voltage, can be transmitted to a limiting-value indicator $GM_1$, which may give an alarm signal and may indicate e.g. the limiting values for a short circuit (high current corresponding to high frequency) or for an interruption of the current. The oscillation communicated from the voltage-frequency converter SFW is transformed into a digital indication by means of a recording device Z incorporating selectors which work through all the electrode numbers in known manner at constant intervals of time, the recorded result being transmitted to a digital indicator DA or a printer DR. The recorder Z can be connected to a second limiting-value indicator $GM_2$ which responds to given values of those currents which are determined as a drop of the potential across the tapes S. Suitably the limiting-value indicator $GM_2$ is designed to allow for adjustment of its width of tolerance.

In this case, when the present measuring system is put into operation, a wide tolerance band may be selected first so as to allow coarse adjustment of those electrodes at which the current values differ seriously from the desired mean value. The limiting-value indicator $GM_2$ may conveniently be placed in the position where the limiting-value indicator $GM_1$ is placed, that is to say at a stage in the transmission of the measured value at which the measured value is still analogous. An automatic drive means AD for adjusting the spacings of electrodes is shown in FIG. 3 connected to limiting-value indicator $GM_2$ to provide automatic adjustment of the spacings of electrodes whose current is outside the tolerance band of $GM_2$.

Electrolytic cells used for the production of chlorine may have the form of an elongated trough having sealed covers to which in turn are secured the individual electrode holders. The copper tapes or like conductors and current supply lines leading to the collecting bars are disposed above the covers, which are movable to enable the electrodes to be exchanged for repair of replacement. Accordingly, it is a further object of the present invention, for the communication of the values measured, to attach to each individual electrode of an electrolytic cell two electric leads running to a collecting switch plug on the exterior of the cell, and running from that collecting switch plug via detachable plug-connecting lines to a second collector switch plug that is connected to cable-lines leading to the measuring control station. When the cells are adjusted in turn by hand, the plug connections to each cell are preferably arranged to be connected by means of plug-connecting cables to a multiple distributor on the wall of the cell room.

Even in its simplest mode of construction the measuring system of the present invention enables the individual electrodes to be adjusted more accurately and more rapidly than by previous methods. Influences originating from magnetic fields and falsifying the measured value do not occur. On the other hand, the adjustment of the electrodes with the aid of the present measuring system takes only a short time. Electrode adjustment which is necessary due to electrode wear can accordingly be achieved in shorter intervals of time. This means that the mean voltage loss per cell and hence the degree of efficiency of the whole plant are improved. Repeated adjustment of the electrodes also has the advantage that the wear of the electrodes is more uniform. This results in the operational cost being reduced. The control of critical values proposed in accordance with the present invention has a still further advantage, namely the easy identification at any time of the electrodes to be adjusted and a smaller number of individual adjustments than in the case in which individual measurements are made.

I claim:

1. An apparatus for governing the adjustment of the spacing between a plurality of electrodes in electrolytic cells comprising a plurality of substantially equal resistances one each in series with each of said electrodes, a selective switching mechanism connected individually across each of said resistances, said selective switching mechanism having means for cyclical successive individual connection across each of said resistances, a digital measuring and indicating device connected to said selective switching mechanism and having means to provide a cyclical read-out corresponding to the potential drop across each of said resistances for determining the adjustment of the spacing of electrodes whose measured currents most differ from optimum values.

2. An apparatus as set forth in claim 1 wherein a limiting-value indicator is connector to said digital and indicating device, said limiting-value indicator having limiting means providing a tolerance band of indication whereby only those electrodes having currents outside of said tolerance band are indicated.

3. An apparatus as set forth in claim 2 wherein said limiting means is variable to permit said tolerance band to be reduced as the spacings of said electrodes becomes more optimum.

4. An apparatus as set forth in claim 2 wherein drive means for automatically adjusting the spacing of said electrodes are connected to said limiting-value indicator whereby the spacing of electrodes having currents outside of said tolerance band are automatically adjusted.

5. An apparatus as set forth in claim 4 wherein said limiting means is variable to permit said tolerance band to be reduced as the spacing of said electrodes approaches optimum.

6. An apparatus as set forth in claim 1 wherein said digital measuring and indicating device includes a voltage-frequency converter.

7. An apparatus as set forth in claim 1 wherein an alarm device is connected to said digital measuring and indicating device for indicating excessive currents which require the shutdown of said cells.

8. An apparatus as set forth in claim 1 wherein said resistances comprise bundles of current conducting tapes connected in the electrical supply lines to said electrodes.

References Cited

UNITED STATES PATENTS

| | | | |
|---|---|---|---|
| 2,606,869 | 8/1952 | Perret-Bit | 204—225 |
| 3,052,618 | 9/1962 | Deprez et al. | 204—250 XR |
| 3,288,693 | 11/1966 | Livshits | 204—225 XR |
| 3,317,413 | 5/1967 | Chambran | 204—245 XR |
| 3,329,592 | 7/1967 | Uhrenholdt | 204—225 XR |
| 3,361,654 | 1/1968 | Deprez et al. | 204—128 XR |
| 3,396,095 | 8/1968 | Van Diest et al. | 204—250 XR |
| 3,219,570 | 11/1965 | Wunderli | 204—225 |
| 3,245,898 | 4/1966 | Wunderli | 204—225 |

FOREIGN PATENTS

| | | |
|---|---|---|
| 36/23,309 | 12/1961 | Japan. |
| 1,193,683 | 5/1965 | Germany. |

HOWARD S. WILLIAMS, Primary Examiner

D. R. VALENTINE, Assistant Examiner

U.S. Cl. X.R.

204—128, 228